United States Patent [19]

Sakaguchi et al.

[11] Patent Number: 5,776,846

[45] Date of Patent: Jul. 7, 1998

[54] ULTRAVIOLET- AND INFRARED-ABSORBING GLASS

[75] Inventors: Koichi Sakaguchi; Yukihito Nagashima; Isamu Kuroda; Shigekazu Yoshii, all of Osaka, Japan

[73] Assignee: Nippon Sheet Glass Co., Ltd., Osaka, Japan

[21] Appl. No.: 782,173

[22] Filed: Jan. 14, 1997

[51] Int. Cl.$^6$ ..................... C03C 3/087
[52] U.S. Cl. ............... 501/70; 501/69; 501/71
[58] Field of Search ................. 501/69, 70, 71

[56] References Cited

U.S. PATENT DOCUMENTS

| | | | |
|---|---|---|---|
| 3,723,142 | 3/1973 | Kato et al. | 501/71 |
| 4,101,705 | 7/1978 | Fischer et al. | 501/71 |
| 4,104,076 | 8/1978 | Pons | 501/71 |
| 4,866,010 | 9/1989 | Boulos et al. | 501/71 |
| 5,264,400 | 11/1993 | Nakaguchi et al. | 501/71 |
| 5,318,931 | 6/1994 | Nakaguchi et al. | 501/64 |
| 5,385,872 | 1/1995 | Gulotta et al. | 501/71 |
| 5,558,942 | 9/1996 | Itoh et al. | 428/426 |
| 5,700,579 | 12/1997 | Jeanvoine et al. | 428/437 |

FOREIGN PATENT DOCUMENTS

| | | |
|---|---|---|
| 0561337 | 9/1993 | European Pat. Off. . |
| 0653387 | 5/1995 | European Pat. Off. . |
| 4313215 | 10/1993 | Germany . |
| 4-310539 | 11/1992 | Japan ............. C03C 4/08 |
| 6345482 | 12/1994 | Japan . |
| 6345483 | 12/1994 | Japan . |

*Primary Examiner*—Mark L. Bell
*Assistant Examiner*—Louis M. Troilo
*Attorney, Agent, or Firm*—Sughrue, Mion, Zinn, Macpeak & Seas, PLLC

[57] ABSTRACT

Ultraviolet- and infrared-absorbing glass comprising: as basic glass components, 65 to 80% by weight of $SiO_2$, 0 to 5% by weight of $Al_2O_3$, 0 to 10% by weight of MgO, 5 to 15% by weight of CaO, 10 to 18% by weight of $Na_2O$, 0 to 5% by weight of $K_2O$, 5 to 15% by weight in total of MgO and CaO, 10 to 20% by weight in total of $Na_2O$ and $K_2O$, and 0 to 5% by weight of $B_2O_3$; and in the first embodiment, as coloring components, 0.25 to 0.45% by weight, in terms of $Fe_2O_3$, of total iron oxide (T-$Fe_2O_3$) having an FeO/T-$Fe_2O_3$ ratio, in terms of $Fe_2O_3$, of 15.5 to 25.0%, 0.8 to 2.0% by weight of $CeO_2$, 0 to 1.0% by weight of $TiO_2$, 0 to 0.005% by weight of CoO, and 0.0005 to 0.005% by weight of Se; or in the second embodiment, as coloring components, 0.25 to 0.5% by weight, in terms of $Fe_2O_3$, of total iron oxide (T-$Fe_2O_3$) having an FeO/T-$Fe_2O_3$ ratio, in terms of $Fe_2O_3$, of 5.0 to 20.0%, 1.4 to 2.0% by weight of $CeO_2$, 0 to 0.4% by weight of $TiO_2$, 0 to 0.002% by weight of CoO, and 0.0005 to 0.005% by weight of Se.

15 Claims, No Drawings

5,776,846

ULTRAVIOLET- AND INFRARED-ABSORBING GLASS

FILED OF THE INVENTION

This invention relates to ultraviolet- and infrared- absorbing glass which has a bronze tint and is particularly excellent in ultraviolet-absorbing power.

BACKGROUND OF THE INVENTION

In order to meet the demand for protection of interior trim of automobiles against deterioration, which has been increasing with the recent trend to luxury of the interior trim, and to reduce the load of air conditioning, glass having ultraviolet- and infrared-absorbing power (UV-and IR-absorbing power) has recently been proposed as window glass of automobiles.

For example, green-tinted glass having a relatively high $Fe_2O_3$ content to exhibit improved heat ray- and UV-absorbing power has been developed for use in automobiles.

The UV-absorbing power of glass having a bronze tint, on the other hand, can be improved by using $Fe_2O_3$ in a lesser amount than in the green-tinted glass in combination with $CeO_2$ and $TiO_2$. To cite an example, JP-A-6-40741 (the term "JP-A" as used herein means an "unexamined published Japanese patent application") discloses heat ray-absorbing glass having a bronze tint, which has a basic glass composition comprising 68 to 74 wt % of $SiO_2$, 0.1 to 3 wt % of $Al_2O_3$, 2 to 4.5 wt % of MgO, 8 to 11 wt % of CaO, 11.5 to 16 wt % of $Na_2O$, 0.5 to 3.0 wt % of $K_2O$, and 0.1 to 0.4 wt % of $SO_3$, the total amount of $SiO_2$ and $Al_2O_3$ being 68 to 74 wt %, the total amount of CaO and MgO being 11 to 15 wt %, and the total amount of $Na_2O$ and $K_2O$ being 12 to 17 wt %, and further contains, as coloring components, 0.13 to 0.55 wt %, in terms of $Fe_2O_3$, of total iron oxide, 0.2 to 0.6 wt % of $CeO_2$, 0.15 to 0.45 wt % of $TiO_2$, 0.3 to 14 ppm of CoO, and 5 to 20 ppm of Se. The rate of reduction ($Fe^{2+}/Fe^{3+}$) of the glass is 17 to 55%.

JP-A-6-345482 discloses UV-absorbing tinted glass, which has a brown tint and comprises 65 to 75 wt % of $SiO_2$, 0.1 to 5 wt % of $Al_2O_3$, 1 to 6 wt % of MgO, 5 to 15 wt % of CaO, 10 to 18 wt % of $Na_2O$, 0 to 5 wt % of $K_2O$, 0.05 to 1.0 wt % of $SO_3$, 0.2 to 1.5 wt % of $CeO_2$, 0 to 1.0 wt % of $TiO_2$, 0 to 0.0015 wt % of CoO, 0.0002 to 0.0012 wt % of Se, and 0.2 to 0.4 wt % of $Fe_2O_3$, in which 3 to 15 wt % of the total Fe is in the form of $Fe^{2+}$.

The above-mentioned conventional UV- and IR-absorbing glass owes its UV-absorbing characteristics to UV absorption by $Fe_2O_3$, $CeO_2$ and $TiO_2$ and interactions among them. However, in glass having a bronze tint owing to the color development of Se, since the $Fe_2O_3$ content must be relatively low in order to maintain the pink color formation of Se, it has been difficult to obtain high UV-absorbing power while retaining the bronze tint. That is, an increase in $TiO_2$ content tends to result in yellowing, and an increase in $CeO_2$ content does not always lead to an effective increase in UV-absorbing power depending on the oxidation-reduction balance of glass. The present invention has been made in the light of the above-described problems associated with the conventional techniques.

SUMMARY OF THE INVENTION

An object of the present invention is to provide UV-and IR-absorbing glass which has a bronze tint and yet excellent UV-absorbing power.

Other objects and effects of the present invention will be apparent from the following description.

The present invention relates to, as a first embodiment, ultraviolet- and infrared-absorbing glass comprising:
as basic glass components,
65 to 80% by weight of $SiO_2$,
0 to 5% by weight of $Al_2O_3$,
0 to 10% by weight of MgO,
5 to 15% by weight of CaO,
10 to 18% by weight of $Na_2O$,
0 to 5% by weight of $K_2O$,
5 to 15% by weight in total of MgO and CaO,
10 to 20% by weight in total of $Na_2O$ and $K_2O$, and
0 to 5% by weight of $B_2O_3$; and
as coloring components,
0.25 to 0.45% by weight, in terms of $Fe_2O_3$, of total iron oxide (T-$Fe_2O_3$) having an FeO/T-$Fe_2O_3$ ratio, in terms of $Fe_2O_3$, of 15.5 to 25.0%,
0.8 to 2.0% by weight of $CeO_2$,
0 to 1.0% by weight of $TiO_2$,
0 to 0.005% by weight of CoO, and
0.0005 to 0.005% by weight of Se.

In a first preferred embodiment of the first embodiment of the present invention, the ultraviolet- and infrared-absorbing glass preferably comprises: as coloring components,
0.25 to 0.35% by weight, in terms of $Fe_2O_3$, of T-$Fe_2O_3$ having an FeO/T-$Fe_2O_3$ ratio, in terms of $Fe_2O_3$, of 15.5 to 25.0%,
1.4 to 2.0% by weight of $CeO_2$,
0 to 0.6% by weight of $TiO_2$,
0 to 0.002% by weight of CoO, and
0.0005 to 0.005% by weight of Se.

In a second preferred embodiment of the first embodiment of the present invention, the ultraviolet- and infrared-absorbing glass preferably comprises: as coloring components,
0.25 to 0.35% by weight, in terms of $Fe_2O_3$, of T-$Fe_2O_3$ having an FeO/T-$Fe_2O_3$ ratio, in terms of $Fe_2O_3$, of 15.5 to 25.0%,
1.55 to 2.0% by weight of $CeO_2$,
0 to 0.4% by weight of $TiO_2$,
0 to 0.002% by weight of CoO, and
0.0005 to 0.005% by weight of Se.

The present invention relates to, as a second embodiment, ultraviolet- and infrared-absorbing glass comprising:
as basic glass components,
65 to 80% by weight of $SiO_2$,
0 to 5% by weight of $Al_2O_3$,
0 to 10% by weight of MgO,
5 to 15% by weight of CaO,
10 to 18% by weight of $Na_2O$,
0 to 5% by weight of $K_2O$,
5 to 15% by weight in total of MgO and CaO,
10 to 20% by weight in total of $Na_2O$ and $K_2O$, and
0 to 5% by weight of $B_2O_3$; and
as coloring components,
0.25 to 0.5% by weight, in terms of $Fe_2O_3$, of total iron oxide (T-$Fe_2O_3$) having an FeO/T-$Fe_2O_3$ ratio, in terms of $Fe_2O_3$, of 5.0 to 20.0%,
1.4 to 2.0% by weight of $CeO_2$, 0 to 0.4% by weight of $TiO_2$, 0 to 0.002% by weight of CoO, and 0.0005 to 0.005% by weight of Se.

In a preferred embodiment of the second embodiment of the present invention, the ultraviolet- and infrared-absorbing glass preferably comprises: as coloring components, 0.25 to 0.5% by weight, in terms of $Fe_2O_3$, of $T-Fe_2O_3$ having an $FeO/T-Fe_2O_3$ ratio, in terms of $Fe_2O_3$, of 5.0 to 20.0%, 1.55 to 2.0% by weight of $CeO_2$, 0 to 0.4% by weight of $TiO_2$, 0 to 0.002% by weight of CoO, and 0.0005 to 0.005% by weight of Se.

DETAILED DESCRIPTION OF THE INVENTION

With the thickness being fixed at 4 mm, the UV- and IR-absorbing glass according to the first and second embodiments of the present invention preferably has a visible light transmission of 70% or more as measured in a wavelength region of 380 to 770 nm with the CIE standard illuminant A; a dominant wavelength of 574 to 580 nm and an excitation purity of less than 11% both as measured in a wavelength region of 380 to 770 nm with the CIE standard illuminant C; and a total solar energy transmission of less than 72% as measured in a wavelength region of 300 to 2100 nm. The glass also preferably has a total sunlight UV transmission of less than 12% as measured in a wavelength region of 297.5 to 377.5 nm according to ISO 9050. It is also preferred that the UV- and IR-absorbing glass preferably has, with a thickness of 4 mm, a UV transmission of less than 34% at a wavelength of 370 nm.

The grounds for limitations of the basic glass composition of the UV- and IR-absorbing glass according to the invention are explained below. In what follows, all the percents are given by weight.

$SiO_2$ is a main component forming the skeleton of glass. If its content is less than 65%, glass has reduced durability. If it exceeds 80%, the composition is difficult to melt.

$Al_2O_3$ serves to improve durability of glass. If its content exceeds 5%, the composition is difficult to melt. A preferred $Al_2O_3$ content is from 0.1 to 2%.

MgO and CaO both serve to improve durability of glass and to control the liquidus temperature and viscosity at the time of glass forming. If the MgO content exceeds 10%, the liquidus temperature rises. If the CaO content is less than 5% or higher than 15%, the liquidus temperature rises. If the total content of MgO and CaO is less than 5%, the resulting glass has reduced durability. If it exceeds 15%, the liquidus temperature rises.

$Na_2O$ and $K_2O$ are used as a glass melting accelerator. If the $Na_2O$ content is less than 10%, or if the total content of $Na_2O$ and $K_2O$ is less than 10%, the effect of melting acceleration is weak. If $Na_2O$ content exceeds 18%, or if the total content of $Na_2O$ and $K_2O$ exceeds 20%, durability is reduced. It is unfavorable that the $K_2O$ exceeds 5% because it is more expensive than $Na_2O$.

While $B_2O_3$ is a component used for improvement of durability and also as a melting aid, it also functions to enhance UV absorption. If it exceeds 5.0%, exertion of the light transmission reducing effect would be extended over the visible region, and the glass tends to assume a yellow tint. Moreover, vaporization of $B_2O_3$ on forming would cause troubles. Accordingly, the upper limit of the $B_2O_3$ content should be 5.0%.

Iron oxide is present in glass in the form of $Fe_2O_3$ and FeO. The former $Fe_2O_3$ is a component serving to increase UV-absorbing power together with $CeO_2$ and $TiO_2$, while the latter FeO is a component serving to increase heat ray-absorbing power. Too small an $Fe_2O_3$ content is insufficient for obtaining satisfactory UV- and heat ray-absorbing power. Too high the content changes the developed color of Se from pink to brown, failing to obtain a bronze tint.

In the first embodiment of the invention, the total iron oxide ($T-Fe_2O_3$) content ranges from 0.25 to 0.45%, preferably 0.25 to 0.35%, in terms of $Fe_2O_3$. If the $FeO/T-Fe_2O_3$ ratio is too small, the FeO content is insufficient for obtaining desired heat ray-absorbing power, and the $CeO_2$ component hereinafter described is not reduced sufficiently, resulting in reduction in UV-absorbing power. If the $FeO/T-Fe_2O_3$ ratio is too large, the resulting glass assumes a strong brown tint, and vaporization of Se becomes considerable on melting. It has been found that high UV-absorbing power, a bronze tint, and moderate heat ray-absorbing power can be obtained in the first embodiment by setting the $FeO/T-Fe_2O_3$ ratio within a range of from 0.155 to 0.25. The amount of FeO as referred to above is in terms of $Fe_2O_3$.

$CeO_2$ is a component for enhancing UV absorption. It exists in glass in the form of $Ce^{3+}$ or $Ce^{4+}$. Showing weak absorption in the visible region, $Ce^{3+}$ is more effective for UV absorption. As stated above, the $CeO_2$ content should range from 0.8 to 2.0% under the oxidation-reduction balance satisfying $0.155 \leq FeO/T-Fe_2O_3 \leq 0.25$ as in the first embodiment. If it is less than 0.8%, the UV-absorbing effect is insufficient. If it exceeds 2.0%, the absorption in the shorter wavelength side of the visible region is so strong that the glass will have a yellow tint, failing to have a desired visible transmission and a desired dominant wavelength. In order to substantially prevent glass from acquiring a yellow tint and to obtain further improved UV-absorbing power, the $CeO_2$ content is preferably 1.4 to 2.0%, still preferably 1.55 to 2.0% in the first embodiment.

In the second embodiment of the invention, the total iron oxide content in terms of $Fe_2O_3$ ranges from 0.25 to 0.5%. In the second embodiment, to secure the same level of heat ray-absorbing power as obtained in the first embodiment, FeO should be used in the same amount as in the glass of the first embodiment. The total iron oxide content of the second embodiment is slightly higher so that the $FeO/T-Fe_2O_3$ ratio should be set lower, i.e., $0.05 \leq FeO/T-Fe_2O_3 \leq 0.20$. It has been found that high UV-absorbing power, a bronze tint, and moderate heat ray-absorbing power can be obtained through this constitution. Under the oxidation-reduction balance satisfying $0.05 \leq FeO/T-Fe_2O_3 \leq 0.20$ as in the second embodiment, the $CeO_2$ content ranges from 1.4 to 2.0%, preferably 1.55 to 2.0%, as described above.

$TiO_2$ is a component for increasing UV-absorbing power through the mutual action especially with FeO. If the $TiO_2$ content exceeds 1.0%, the glass will acquire a yellow tint. A preferred $TiO_2$ content is 0 to 0.6%, particularly 0 to 0.4%.

CoO is a component which develops a bronze color in the presence of Se. If the CoO content exceeds 0.005%, the visible transmission is reduced. A preferred CoO content is 0 to 0.002%.

Se develops a pink tint and cooperates with CoO which has a complementary color to the pink tint to provide a bronze tint. If the Se content is less than 0.0005%, a desired color cannot be developed. If it exceeds 0.005%, the visible transmission is reduced.

As long as the bronze tint as aimed at is not impaired, glass having the composition according to the present invention may further contain one or more other components, such as coloring components, e.g., NiO, MnO, $V_2O_5$, $MoO_3$, etc., and $SnO_2$ as a reducing agent, in a total amount of up to 1%.

The present invention will now be illustrated in greater detail by way of Examples, but the present invention is not construed as being limited thereto.

EXAMPLES 1 TO 11

A typical soda-lime-silica glass batch was appropriately compounded with ferric oxide, titanium oxide, cerium oxide, cobalt oxide, sodium selenite, and a carbonaceous reducing agent, and the resulting batch was heat-melted at 1500° C. for 4 hours in an electric furnace. The molten glass was cast on a stainless steel plate and slowly cooled to room temperature to obtain a glass plate having a thickness of about 6 mm. The glass plate was polished to prepare a 4 mm thick glass sample for evaluating optical characteristics.

A visible light transmission (YA) measured with the CIE standard illuminant A, a total solar energy transmission (TG), a UV transmission ($T_{UV}$) specified by ISO 9050, and a dominant wavelength (Dw) and an excitation purity (Pe) measured with the CIE standard illuminant C were obtained. As an additional measure for UV transmission, a UV transmission at 370 nm ($T_{370}$), at which the change in transmission sensitively appears in the course of the steep rise from the absorption end of the transmission curve, was measured.

In Table 1 below are shown the T-$Fe_2O_3$ content, FeO/T-$Fe_2O_3$ ratio, $CeO_2$ content, $TiO_2$ content, CoO content, Se content, and optical characteristics of the samples. All the contents are expressed in terms of percent by weight.

content was lower than those of the samples of Examples 1 to 3. It is seen that these samples had an excitation purity of less than 7% and exhibited a favorable bronze tint with an unfavorable yellow tint suppressed.

Examples 6 to 9 fall within the scope of the second preferred embodiment of the first embodiment. The samples had a lower $TiO_2$ content and also a higher $CeO_2$ content than the glass of Examples 1 to 3. As a result, the samples exhibited not only a favorable bronze tint with a yellow tint suppressed but a reduced transmission at 370 nm ($T_{370}$), namely, excellent UV-absorbing power.

The samples of Examples 10 and 11, which fall within the scope of the second embodiment of the present invention, exhibited not only a favorable bronze tint with a yellow tint suppressed but also a reduced transmission at 370 nm ($T_{370}$), namely, excellent UV-absorbing power.

Accordingly, the glass of the Examples 4 to 11 is especially expected to exhibit an excellent deterioration preventive effect on interior trim when used as window glass of vehicles, such as automobiles, or buildings.

COMPARATIVE EXAMPLES 1 TO 3

In Table 1 are also shown Comparative Examples 1 to 3 each having a glass composition out of the scope of the present invention. Comparative Example 1 shows one of the compositions given in the working examples of JP-A-6-40741, previously cited as a conventional technique, and its characteristics. Comparative Examples 2 and 3 show two examples of the compositions given in the working examples of JP-A-6-345482, previously cited as conventional techniques, and their characteristics. The optical char-

TABLE 1

| | T—$Fe_2O_3$ | FeO/ T—$Fe_2O_3$ | $CeO_2$ | $TiO_2$ | CoO | Se | YA (%) | TG (%) | $T_{UV}$ (%) | $T_{370}$ (%) | Dw (nm) | Pe (%) |
|---|---|---|---|---|---|---|---|---|---|---|---|---|
| Example 1 | 0.30 | 0.172 | 1.20 | 0.53 | 0.0010 | 0.0015 | 72.5 | 68.6 | 9.7 | 27.4 | 578 | 10.2 |
| Example 2 | 0.411 | 0.223 | 0.91 | 0.39 | — | 0.0008 | 71.7 | 59.8 | 9.8 | 28.7 | 576 | 10.9 |
| Example 3 | 0.35 | 0.155 | 0.91 | 0.96 | 0.0013 | 0.0014 | 73.1 | 67.5 | 9.1 | 26.6 | 576 | 8.5 |
| Example 4 | 0.30 | 0.170 | 1.50 | 0.23 | 0.0015 | 0.0016 | 73.8 | 69.8 | 9.8 | 28.6 | 578 | 6.6 |
| Example 5 | 0.30 | 0.174 | 1.50 | — | 0.0015 | 0.0016 | 72.6 | 68.1 | 10.9 | 32.3 | 579 | 5.1 |
| Example 6 | 0.30 | 0.168 | 1.70 | 0.23 | 0.0013 | 0.0014 | 74.5 | 69.6 | 9.1 | 26.4 | 577 | 7.5 |
| Example 7 | 0.32 | 0.222 | 1.70 | — | 0.0013 | 0.0014 | 70.0 | 65.0 | 10.7 | 26.4 | 579 | 8.4 |
| Example 8 | 0.30 | 0.226 | 1.70 | 0.23 | 0.0013 | 0.0014 | 71.0 | 64.6 | 8.6 | 24.7 | 577 | 8.1 |
| Example 9 | 0.30 | 0.155 | 1.70 | — | 0.0013 | 0.0014 | 73.5 | 68.8 | 10.3 | 28.2 | 577. | 7.1 |
| Example 10 | 0.42 | 0.133 | 1.70 | — | 0.0013 | 0.0014 | 73.0 | 67.4 | 8.8 | 26.1 | 577 | 8.0 |
| Example 11 | 0.45 | 0.123 | 1.90 | — | 0.0013 | 0.0014 | 71.5 | 67.2 | 8.0 | 25.2 | 577 | 8.1 |
| Comparative Example 1 | 0.397 | 0.218 | 0.41 | 0.31 | 0.00006 | 0.00081 | 73.4 | 59.5 | 16.7 | — | 574.3 | 8.4 |
| Comparative Example 2 | 0.38 | 0.135 | 0.30 | 0.80 | 0.0015 | 0.0002 | 71.1* | 62.3* | 13.46* | — | 575.3* | 4.71* |
| Comparative Example 3 | 0.21 | 0.042 | 1.30 | 0.10 | 0.0013 | 0.0010 | 74.3* | 64.8* | 11.71* | — | 580.5* | 5.87* |

Note:
*The optical characteristics of Comparative Examples 2 and 3 are those obtained for glass samples having a thickness of 5 mm.

Examples 1 to 9 fall within the scope of the first embodiment of the present invention, and Examples 10 and 11 fall within the second embodiment. As is apparent from Table 1, all the samples of Examples 1 to 11 having a thickness of 4 mm had a visible light transmission (YA) of 70% or more as measured with the illuminant A, a dominant wavelength (Dw) of 574 to 580 nm and an excitation purity (Pe) of less than 11% as measured with the illuminant C, a total solar energy transmission (TG) of less than 72%, and a UV transmission ($T_{UV}$, specified in ISO 9050) of less than 12%.

In Examples 4 and 5 fall within the scope of the first preferred embodiment of the first embodiment, the $TiO_2$ acteristics of Comparative Examples 2 and 3 are those obtained for glass samples having a thickness of 5 mm.

As is apparent from Table 1, the glass of Comparative Examples 1 to 3 have a higher UV transmission ($T_{UV}$) than the samples according to the invention, indicating inferiority in UV-absorbing power.

As has been fully described, the present invention makes it possible to provide UV- and IR-absorbing glass having excellent UV-absorbing power.

Further, because of the high UV-absorbing power and a bronze tint, the glass of the invention is highly effective in

What is claimed is:

1. Ultraviolet- and infrared- absorbing glass comprising: as basic glass components, 65 to 80% by weight of $SiO_2$, 0 to 5% by weight $Al_2O_3$, 0 to 10% by weight of MgO, 5 to 15% by weight of CaO, 10 to 18% by weight of $Na_2O$, 0 to 5 % by weight of $K_2O$, 5 to 15% by weight in total of MgO and CaO, 10 to 20% by weight in total of $Na_2O$ and $K_2O$, and 0 to 5% by weight of $B_2O_3$; and as coloring components, 25 to 0.45% by weight, in terms of $Fe_2O_3$, of total iron oxide (T-$Fe_2O_3$) having an FeO/T-$Fe_2O_3$ ratio, in terms of $Fe_2O_3$, of 0.155 to 0.174, 0.8 to 2.0% by weight of $CeO_2$, 0 to 1.0% by weight of $TiO_2$, 0 to 0.005% by weight of CoO, and 0.0005 to 0.005% by weight of Se, wherein said glass with a thickness of 4 mm has an excitation purity of less than 11% as measured with the CIE standard illuminant C.

2. Ultraviolet- and infrared-absorbing glass as claimed in claim 1, wherein said glass comprises:

as coloring components, 0.25 to 0.35% by weight, in terms of $Fe_2O_3$ of T-$Fe_2O_3$ having an FeO/T-$Fe_2O_3$ ratio, in terms of $Fe_2O_3$, of 0.155 to 0.174, 1.4 to 2.0% by weight of $CeO_2$, 0 to 0.6% by weight of $TiO_2$, 0 to 0.002% by weight of CoO, and 0.0005 to 0.005% by weight of Se.

3. Ultraviolet- and infrared-absorbing glass as claimed in claim 2, wherein said glass comprises: as coloring components, 0.25 to 0.35% by weight, in terms of $Fe_2O_3$, of T-$Fe_2O_3$ having an FeO/T-$Fe_2O_3$ ratio, in terms of $Fe_2O_3$, of 0.155 to 0.174, 1.55 to 2.0% by weight of $CeO_2$, 0 to 0.4% by weight of $TiO_2$, 0 to 0.002% by weight of CoO, and 0.0005 to 0.005% by weight of Se.

4. Ultraviolet- and infrared-absorbing glass comprising: as basic glass components, 65 to 80% by weight of $SiO_2$, 0 to 5% by weight $Al_2O_3$, 0 to 10% by weight of MgO, 5 to 15% by weight of CaO, 10 to 18% by weight of $Na_2O$, 0 to 5% by weight of $K_2O$, 5 to 15% by weight in total of MgO and CaO, 10 to 20% by weight in total of $Na_2O$ and $K_2O$, and 0 to 5% by weight of $B_2O_3$; and as coloring components, 0.25 to 0.45% by weight, in terms of $Fe_2O_3$, of total iron oxide (T-$Fe_2O_3$) having an FeO/T-$Fe_2O_3$ ratio, in terms of $Fe_2O_3$ of 0.050 to 0.174, 1.4 to 2.0% by weight of $CeO_2$, 0 to 0.4% by weight of $TiO_2$, 0 to 0.002% by weight of CoO, and 0.0005 to 0.005% by weight of Se, wherein said glass with a thickness of 4 mm has an excitation purity of less than 11% as measured with the CIE standard illuminant C.

5. Ultraviolet- and infrared-absorbing glass as claimed in claim 4, wherein said glass comprises: as coloring components, 0.25 to 0.5% by weight, in terms of $Fe_2O_3$, of T-$Fe_2O_3$ having an FeO/T-$Fe_2O_3$ ratio, in terms of $Fe_2O_3$, of 0.050 to 0.174, 1.55 to 2.0% by weight of $CeO_2$, 0 to 0.4% by weight of $TiO_2$, 0 to 0.002% by weight of CoO, and 0.0005 to 0.005% by weight of Se.

6. Ultraviolet- and infrared-absorbing glass as claimed in claim 1, wherein said glass with a thickness of 4 mm has a visible light transmission of 70% or more as measured with the CIE standard illuminant A.

7. Ultraviolet- and infrared-absorbing glass as claimed in claim 4, wherein said glass with a thickness of 4 mm has a visible light transmission of 70% or more as measured with the CIE standard illuminant A.

8. Ultraviolet- and infrared-absorbing glass as claimed in claim 1, wherein said glass with a thickness of 4 mm has a total solar energy transmission of less than 72%.

9. Ultraviolet- and infrared-absorbing glass as claimed in claim 4, wherein said glass with a thickness of 4 mm has a total solar energy transmission of less than 72%.

10. Ultraviolet- and infrared-absorbing glass as claimed in claim 1, wherein said glass with a thickness of 4 mm has a dominant wavelength of 574 to 580 nm as measured with the CIE standard illuminant C.

11. Ultraviolet- and infrared-absorbing glass as claimed in claim 4, wherein said glass with a thickness of 4 mm has a dominant wavelength of 574 to 580 nm as measured with the CIE standard illuminant C.

12. Ultraviolet- and infrared-absorbing glass as claimed in claim 1, wherein said glass with a thickness of 4 mm has an ultraviolet transmission of less than 12% as measured according to ISO 9050.

13. Ultraviolet- and infrared-absorbing glass as claimed in claim 4, wherein said glass with a thickness of 4 mm has an ultraviolet transmission of less than 12% as measured according to ISO 9050.

14. Ultraviolet- and infrared-absorbing glass as claimed in claim 1, wherein said glass with a thickness of 4 mm has an ultraviolet transmission of less than 34% at a wavelength of 370 nm.

15. Ultraviolet- and infrared-absorbing glass as claimed in claim 4, wherein said glass with a thickness of 4 mm has an ultraviolet transmission of less than 34% at a wavelength of 370 nm.

* * * * *